United States Patent [19]
Sanelli

[11] 3,797,524
[45] Mar. 19, 1974

[54] FLUID METERING DEVICE

[75] Inventor: Edward T. Sanelli, Buffalo Grove, Ill.

[73] Assignee: Reedmer Plastics Inc., Franklin Park, Ill.

[22] Filed: June 15, 1972

[21] Appl. No.: 263,153

[52] U.S. Cl.............................. 137/606, 251/121
[51] Int. Cl................................. F16k 19/00
[58] Field of Search ............ 137/606, 608, 607, 626

[56] References Cited
UNITED STATES PATENTS

| 3,459,221 | 8/1969 | Axelrod | 137/608 |
| 3,643,694 | 2/1972 | Duke | 137/608 |
| 3,117,587 | 1/1964 | Willinger | 137/608 X |
| 3,331,392 | 7/1967 | Davidson | 137/606 X |
| 1,374,436 | 4/1921 | Conway | 137/606 |
| 3,477,469 | 11/1969 | Paley | 137/608 |

Primary Examiner—Robert G. Nilson
Attorney, Agent, or Firm—Alter, Weiss, Whitesel & Laff

[57] ABSTRACT

Metering apparatus for receiving fluid from one or more sources and delivering the fluid at a controlled rate through one discharge outlet. The apparatus is particularly useful for administration of parenteral solutions. Where the apparatus has a plurality of inlet ports, the flow of fluid through each port is capable of precise and separate control.

4 Claims, 10 Drawing Figures

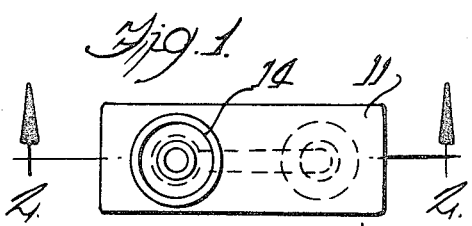
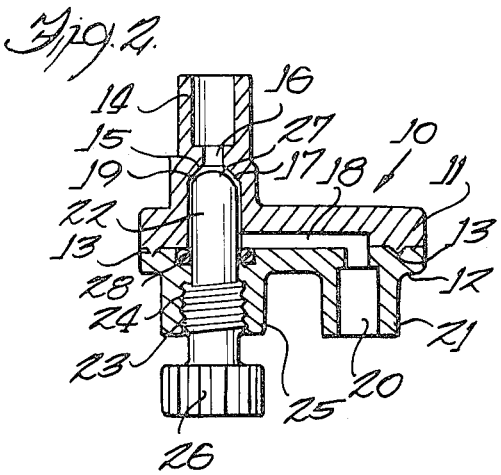
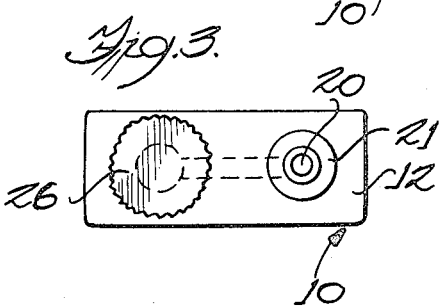
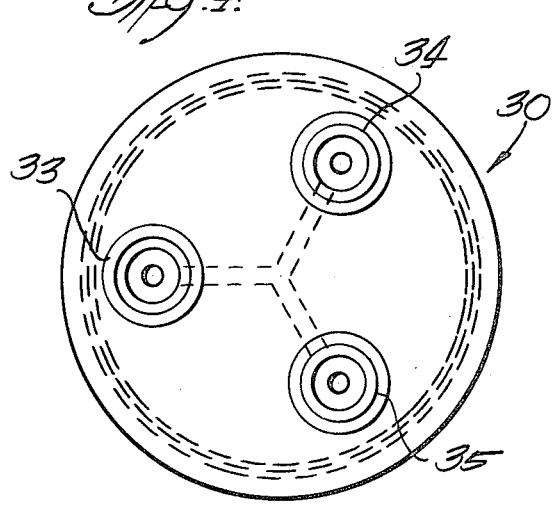
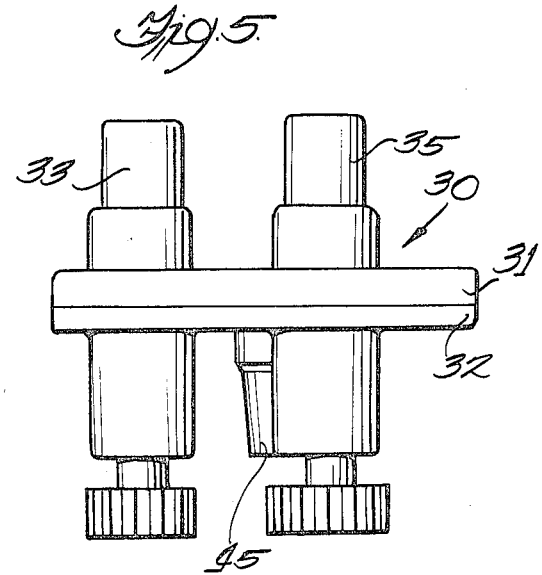
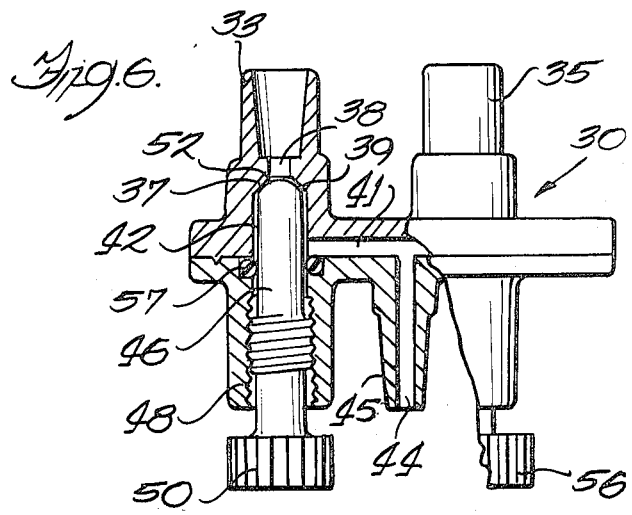

FLUID METERING DEVICE

BACKGROUND OF THE INVENTION

This invention relates to apparatus for controlling liquid flow and more particularly to apparatus which is especially useful for the administration of fluids parenterally.

The administration of parenteral solutions, such as, for example, anaesthetics, hypotensors, muscle relaxants, glucose, blood serum, etc. is common practice today in the medical arts. Generally, the parenteral solutions are administered through flexible tubing, with the liquid flow through the tubing being controlled by a clamp which pinches the tubing so as to restrict the fluid passage in the tubing. A tubing clamp which restricts fluid flow by compressing the tubing is disclosed in U.S. Pat. No. 3,167,085. These "pinch" type clamps have a number of disadvantages. For example, movement of the patient may result in inadvertent displacement of the clamp from its original position, resulting in an undesired change in liquid flow rate, which can be very serious in instances where constant flow rate is imperative. Also, the clamp causes excessive wear of the tubing material, oftentimes resulting in restriction of the fluid passage and even breakage of the tube.

Accordingly, it is an object of this invention to provide flow regulating apparatus which affords accurate control of the flow of parenteral solutions and other fluids. Another object is to provide a flow regulating device which does not exert a pinching action on the flexible tubing through which fluids are administered and does not therefore damage such tubing. Another object is to provide flow regulating apparatus which can be used to simultaneously regulate the flow of several fluids in accurate predetermined proportions and without leakage or inadvertent intermixing of the fluids. Further objects will become manifest from this specification, the drawings and claims.

SUMMARY OF THE INVENTION

In one form, the invention comprises a flow metering device for administering parenteral fluids or the like, having at least one valve chamber with a valve stem adapted for movement therein. The valve stem is threadably engaged with the body of the device. An inlet port or fitment communicates with the valve chamber and is adapted to be connected to flexible tubing which in turn is connected to a source of fluid. An outlet port or fitment likewise communicates with flexible tubing for delivery of the fluid to a patient or other recipient. Where the device has more than one valve chamber, it also has more than one inlet port, each chamber having a corresponding inlet port. In such instances, however, one common outlet port is used and each valve chamber communicates with that port. Because each inlet port is provided with its own valve and each valve stem has fine threads thereon, each inlet port has its own individual precise control with the capability of being completely shut off.

DESCRIPTION OF THE DRAWINGS

FIG. 1 is a plan view of one embodiment of the apparatus of this invention.

FIG. 2 is a cross-sectional view of the apparatus of FIG. 1 taken on the line 2—2.

FIG. 3 is a bottom view of the apparatus of FIG. 1.

FIG. 4 is a plan view of a second embodiment of apparatus according to the present invention.

FIG. 5 is a side view of the apparatus of FIG. 4.

FIG. 6 is a side view similar to FIG. 5 but partially broken away and sectioned.

DESCRIPTION OF THE PREFERRED EMBODIMENTS OF THE INVENTION

Figure 7:
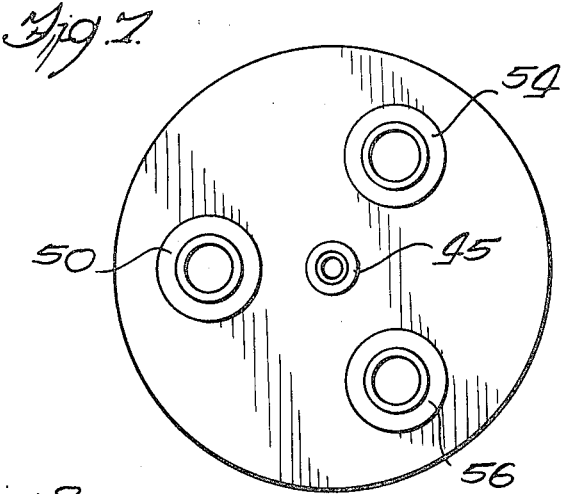
FIG. 7 is a bottom view of the apparatus of FIG. 4.

Referring to FIGS. 1 through 3, there is shown flow metering valve 10 having an upper body portion 11, and a lower body portion 12, both formed of a medically acceptable material and preferably of a dimensionally stable plastic material, such as high density polyethylene, acrylonitrile-butadiene-styrene resins (ABS) and the like. The body portions 11 and 12 can be joined by means such as sonic welding, as indicated by the sonic welding profile 13. The body portion 11 is provided with fluid inlet fitment 14 which can be a conventional Luer tapered fitting adapted to frictionally fit with a corresponding Luer tapered fitting connected to tubing employed for delivery of a fluid such as a parenteral solution. An inwardly projecting shoulder 15 on fitment 14 defines an inlet fluid passage 16 and has a sloped bottom wall which forms the valve seat 17. The slope of wall or seat 17 is illustrated at 45 degrees, but this slope can vary depending upon the configuration of valve stem 22; these two members having complementary abutting portions so as to permit complete shut-off of fluid flow through inlet passage 16. Valve stem 22 can be made of a medically acceptable rigid plastic material similar to or different from body portions 11 and 12.

A fluid passage 18 provides communication between the interior valve chamber 19 and outlet passage 20 which is provided within fluid outlet fitment 21 which, like the inlet fitment 14, is a Luer tapered fitting adapted to fit snugly by friction to a corresponding Luer tapered fitting connected to the delivery tubing. Valve stem 22 is adapted for in-out movement within valve chamber 19 by means of male threads 23 thereon which complement female threads 24 provided on the hollow stem receiving cylinder 25. The outwardly projecting end of valve stem 22 is provided with a knurled operating knob 26 while the distal end 27 is of a configuration to complement seat 17 so as to form a tight fit therebetween when the valve is in fully closed position. An O-ring 28 is provided to seal the slight clearance space between chamber 19 and valve stem 22, thus preventing leakage beyond the threaded areas 23 and 24 and to the exterior of the device. The apparatus above described is adapted for controlled administration of a single fluid or mixture of fluids introduced by means of a flexible tubing into inlet 14. The device will deliver precise amounts or drops of fluid to a patient and is capable of maintaining an exact setting throughout the administration of the fluid.

In FIGS. 4 through 7 there is shown flow metering apparatus according to the invention adapted for receiving fluids from three sources and delivering the fluids in one stream in predetermined proportions. Thus, flow metering valve 30 is formed of an upper body portion 31 and a lower body portion 32, both formed of suitable material as previously indicated. Three fluid inlet fitments 33, 34 and 35 are shown as female Luer fittings and are of similar construction. The fittings 33, 34 and 35 each have inwardly projecting shoulders 37 which define an inlet fluid passage 38 with the sloped bottom thereof forming valve seat 39, as seen from FIG. 6, which shows the interior construction of the apparatus.

A fluid passage 41 provides communication between the interior valve chamber 42 (FIG. 6) and outlet passage 44 located in fluid outlet 45, the latter being shown as a tapered male Luer fitting adapted for snug fit by friction to a corresponding tapered female Luer fitting attached to the fluid delivery tubing. Valve stem 46 is adjustable within the chamber 42 by threaded engagement with the hollow stem receiving cylinder 48. By rotation of the knurled operating knob 50 valve stem 46 can be adjusted to any setting between a fully open position and a fully closed position where the end 52 of the valve stem 46 abuts valve seat 39. The O-ring 57 provides a seal to prevent leakage. Each of the inlet fitments 33, 34 and 35 are in communication with a valve chamber, and fluid flow from each of the fitments through the metering apparatus is controlled by a valve stem, as described above. Knurled operating knobs, such as those designated 54 and 56, are associated with valve stems and provide the means for rotating them (FIG. 7).

FIGS. 4 through 7 show that the fluid inlets 33, 34 and 35 are angularly displaced from each other. In the embodiment 30, the displacement of each is 120°. If the metering device employs more than three fluid inlets, the angle of lateral displacement will be less; the extent of lateral displacement not being at all critical. The fluid outlet 45 is centrally displaced with respect to the fluid inlets.

Figure 8:
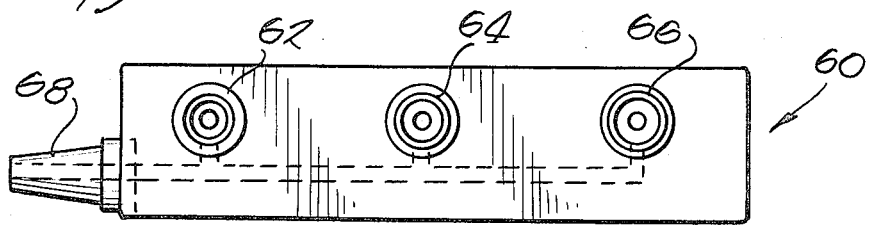
FIG. 8 is a plan view of a further embodiment of apparatus according to the present invention.
Figure 9:
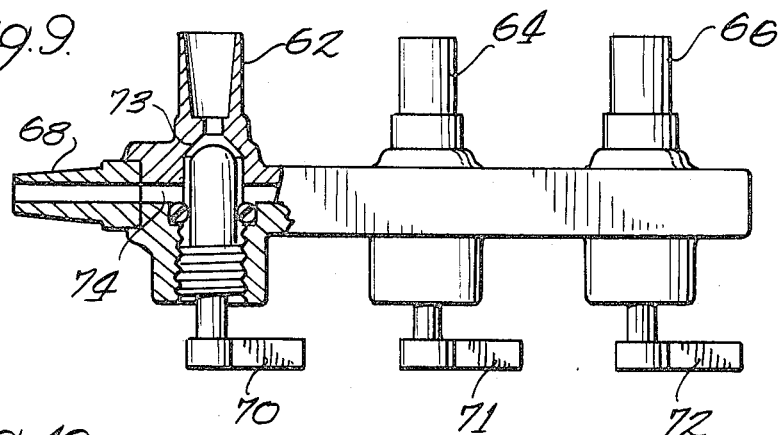
FIG. 9 is a side view partially broken away and sectioned of the apparatus of FIG. 8.
Figure 10:
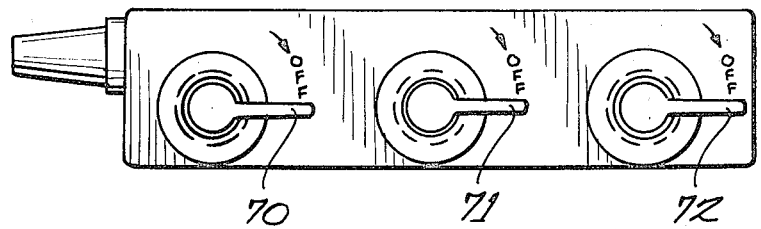
FIG. 10 is a bottom view of the apparatus of FIG. 8.

FIGS. 8 through 10 show a form of the metering apparatus 60 of the invention in which three fluid inlets 62, 64 and 66 are employed with the single fluid outlet 68 being normal to the inlets. Also, in this embodiment of the invention, the fluid inlets and outlet are substantially planarly aligned with the overall metering device being generally rectangular in shape. This form of the apparatus is preferred with respect to ease of attachment to a relatively flat surface such as, for example, the arm of a patient when used for administration of parenteral solutions. As shown, in this embodiment operating handles 70, 71 and 72 are used in lieu of knurled knobs. Otherwise, the structure is similar to those previously described with each of the fluid inlets 62, 64 and 66 being associated with a valve chamber 73 (one shown in detail) with which fluid passage 74 communicates. Each of the operating handles 70, 71 and 72 control the positioning or setting of a valve stem to control the rate of fluid admitted from each of the fluid inlets 62, 64 and 66 and discharged through outlet 68.

The metering apparatus of this invention makes possible the administration of one or more fluids at a predetermined rate or rates with positive control over the discharge rate. By means of the threaded construction, the valve stems can be finely adjusted to a desired position to regulate fluid flow from a particular fluid inlet or to completely shut off flow therefrom. When used for administration of parenteral solutions, several different solutions can be administered separately or in admixture in regulated amounts with a single needle thus alleviating the necessity of several punctures. The metering apparatus of this invention can be provided with any suitable number of fluid inlets so as to be useful for administering in desired proportions a desired plurality of parenteral solutions, either concurrently or separately.

Those modifications and equivalents which fall within the spirit of the invention are to be considered a part thereof.

What is claimed is:

1. Metering apparatus for controlling the amounts of and types of parenteral fluids administered to patients from containers through plastic tubing, said apparatus comprising a valve body, a plurality of valve chambers integral to and contained within said valve body, a first fluid passageway connecting said valve chambers with outlet means, said valve body consisting of a first section and a second section, said sections defining said fluid passageway, sealing means integral to each of said sections for sealing the passageway where said sections abut each other to form said passageway, a valve stem threadably engaged to said first section within each of said valve chambers and adapted for precise movement within said valve chamber, O-ring seal means contiguous to said valve stem, at least one inlet fitting per valve chamber in said second section, said inlet fittings adapted for engagement with the flexible tubing and having an inlet fluid passageway therein communicating with each of said valve chambers, said inlet fittings being coaxial with said valve stem in each of said valve chambers, an outlet fitting on said body adapted for engagement with the flexible tubing and having an outlet fluid passageway directly therein connecting with said first fluid passageway, and handle means for adjusting said valve stems within said valve chambers between an open and closed position to determine the flow through said metering apparatus.

2. The metering apparatus of claim 1 wherein said sealing means comprises a peripheral rabbet in said first section and a mating protrusion on the said second section.

3. The metering apparatus according to claim 2 wherein the inlet fittings are in substantial planar alignment with each other and the outlet fitting is disposed in a plane substantially normal to that of the inlet fittings.

4. The metering apparatus of claim 3 wherein said valve stem is shaped relative to said valve chamber to continuously control the flow of said parenteral fluids as said valve is operated between the open and the closed positions, said handles integral to said valve stem, each of said handles in combination with said valve stems having an L-shaped cross section whereby the amount of flow of said parenteral fluid can readily be gauged by the position of said handles, and said valve body being adapted to be tied to the arm of a patient receiving the parenteral fluid.

* * * * *